Figure 3:
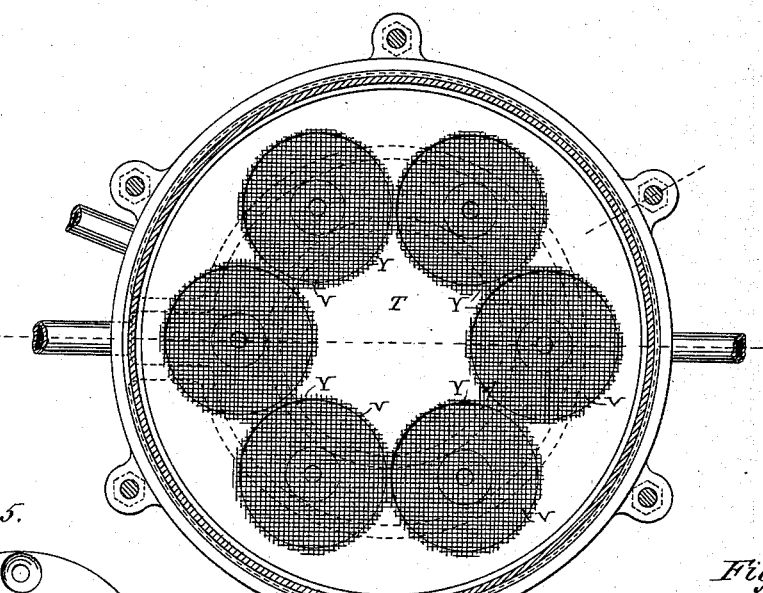

(No Model.) 4 Sheets—Sheet 1.
J. W. HYATT.
FILTER.
No. 322,103. Patented July 14, 1885.
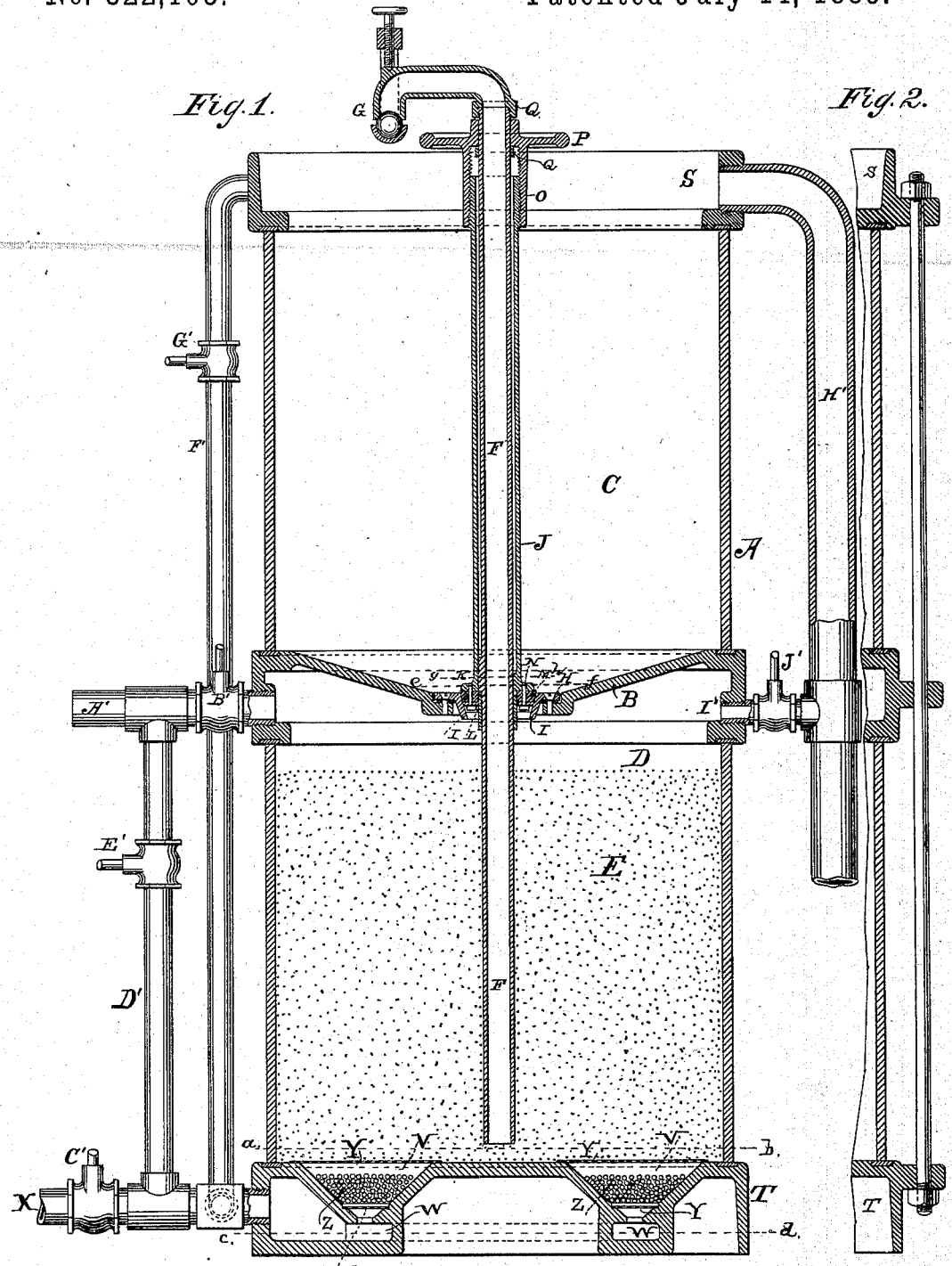
WITNESSES
Edward Wolff
George Cook
INVENTOR
John W. Hyatt
By Rowland Cox
Attorney (No Model.)   4 Sheets—Sheet 2.

J. W. HYATT.
FILTER.

No. 322,103.   Patented July 14, 1885.

WITNESSES
Edward Wolff
George Cook

INVENTOR
John W. Hyatt
By Rowland Cox, Attorney (No Model.)

J. W. HYATT.
FILTER.

No. 322,103. Patented July 14, 1885.

WITNESSES
Edward Wolff.
George Cook.

INVENTOR
John W. Hyatt,
Rowland Cox,
By Attorney

United States Patent Office.

JOHN W. HYATT, OF NEWARK, NEW JERSEY.

FILTER.

SPECIFICATION forming part of Letters Patent No. 322,103, dated July 14, 1885.

Application filed January 7, 1885. (No model.)

*To all whom it may concern:*

Be it known that I, JOHN W. HYATT, a citizen of the United States, and a resident of Newark, in the county of Essex and State of New Jersey, have invented certain new and useful Improvements in Filters, of which the following is a specification.

The invention relates to improvements in filters, and particularly to improvements in the class of filters described and claimed in Letters Patent of the United States issued to me March 6, 1883, No. 273,542, and February 19, 1884, No. 293,750. In the Letters Patent of March 6, 1883, I have illustrated and described a filter in which the bed of granular filtering material, after having become foul from silt and other impurities arrested from the water, is transferred in a current or stream with the water into a separate compartment, and after being there cleansed is returned to the filter proper in a purified condition, after which the operation of filtering is proceeded with, as before. The said Letters Patent of February 19, 1884, describe certain improvements upon the filter claimed in the patent of March 6, 1883, and show a filter composed of an upper and lower compartment provided with suitable inlet and discharge pipes, and connected by a washer-pipe extending through the partition or diaphragm separating the said compartments, the said pipe being utilized for conveying the filtering material with water from the lower to the upper compartment for the purpose of cleansing it, after which, through a central valve, the said filtering material is permitted to return to the lower compartment, and the filtering is proceeded with as before.

I have introduced the said filters, and particularly that shown in the patent of February 19, 1884, into extensive use, and while they have, in every instance, given entirely satisfactory results, I have discovered certain improvements in the construction and arrangement of the transfer washer-pipe connecting the two compartments of the filter, as well as in the valve through which the filtering material is allowed to pass from the upper into the lower compartment, and in certain formations of the base of the filter, which improvements facilitate the operation of the apparatus and render it durable without materially increasing the expense of construction. According to the present invention the central transfer washer-pipe extends upward through the said valve located in the partition between the two compartments of the filter, and the said valve is formed of rubber, which resists the abrasion of the sand or other filtering material passing against it. The base of the filter contains numerous inlets over its surface, whereby upon the reversal of the current for the purpose of cleaning the filtering material the said material will be thoroughly agitated and caused to pass upward through the central washer-pipe, leaving no appreciable or harmful part of the same in the lower compartment.

The invention will be readily understood from the detailed description hereinafter presented, reference being had to the accompanying drawings, in which—

Figure 5:
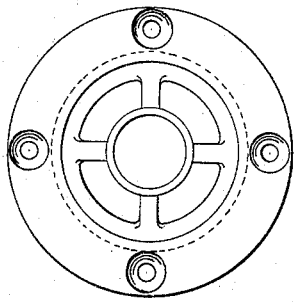
Figure 6:
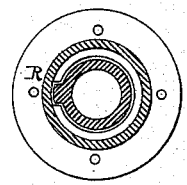
Figure 4:
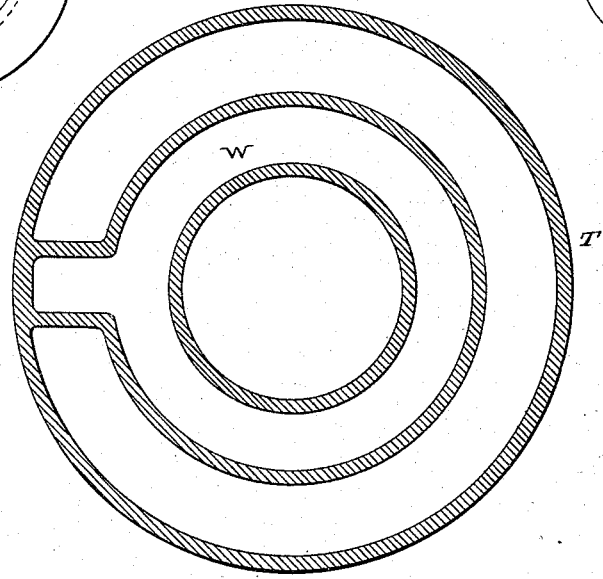
Figure 7:
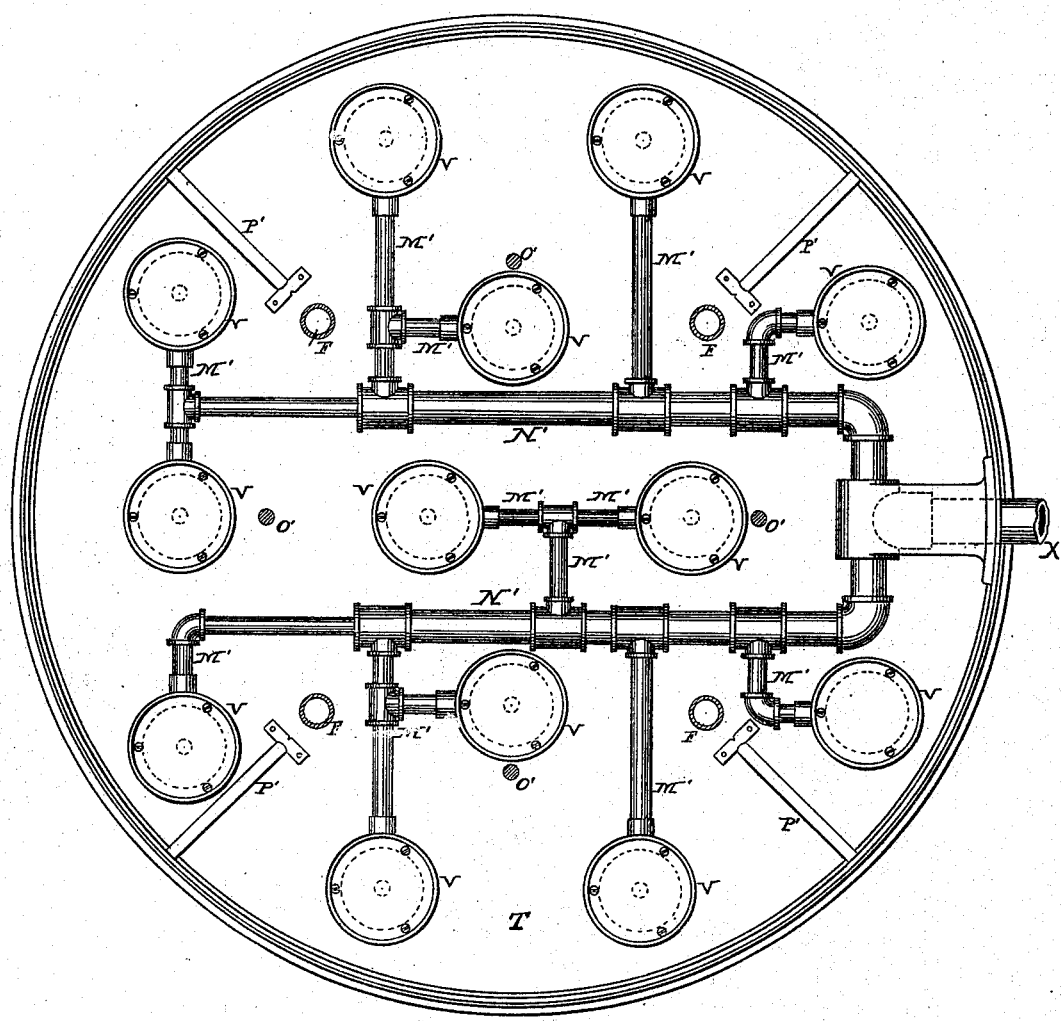
Figure 8:
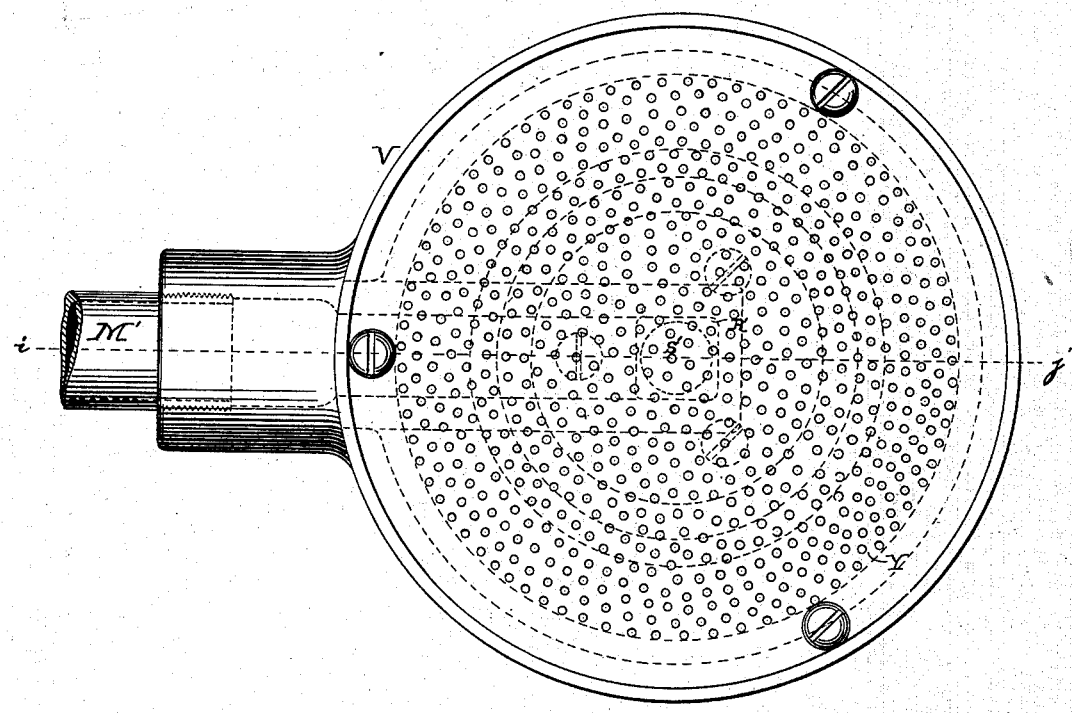
Figure 9:
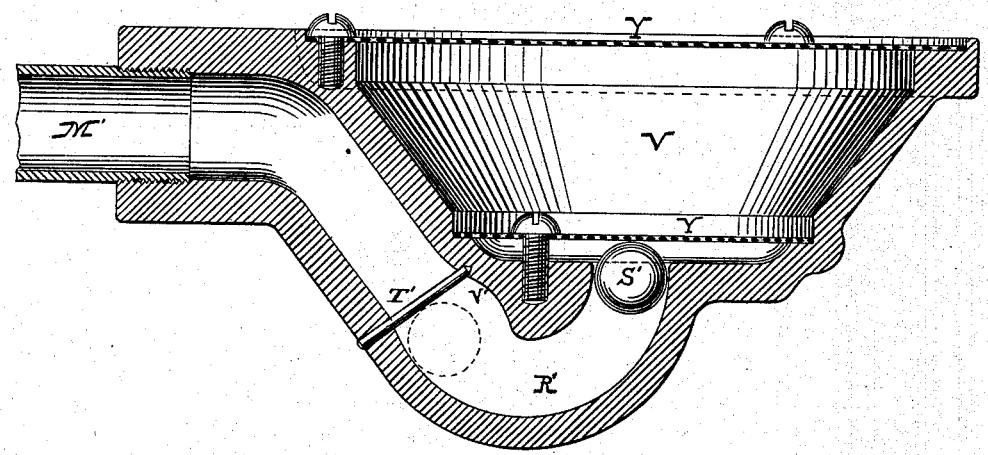

Figure 1 is a central vertical longitudinal section of an apparatus embodying the elements of the invention sought to be protected hereby. Fig. 2 is a detached section of a portion of the filter, illustrating the tie-rods connecting the two heads of the filter. Fig. 3 is a transverse section of the apparatus illustrated in Fig. 1, taken on the dotted line *a b*, and looking downward. Fig. 4 is a similar view of the same on the dotted line *c d*. Fig. 5 is an enlarged view on the line *e f* of Fig. 1. Fig. 6 is a transverse section on the line *g h* of Fig. 1. Fig. 7 is an interior view, looking at the bottom of a filter of large size constructed according to the invention illustrated in Fig. 1. Fig. 8 is an enlarged plan view of one of the funnel-shaped outlets of the filter illustrated in Fig. 7, and Fig. 9 is a central vertical longitudinal section on the line *i j* of Fig. 8.

Referring to Fig. 1, A designates the filter divided by a central diaphragm or partition, B, into two compartments, lettered C D, respectively, the latter containing a bed of granular filtering material E, and the former being of suitable size to receive the same during the washing process hereinbefore described. The compartments C D of the filter are connected by a central transfer washing-pipe, F, passing from a point adjacent to the base of the lower compartment, D, to the upper portion of the compartment C, its upper end being provided with a suitable bend and ball-valve G of well-known construction.

The center of the diaphragm B contains a circular opening provided with a valve-seat, H, having downwardly-converging sides I, as shown in Fig. 1, and the center of this opening forms a suitable space through which the transfer-pipe F passes.

That portion of the washer-pipe F within the upper compartment, C, is inclosed by a vertically-adjustable pipe or cylinder, J, externally threaded upon its upper end and having upon its lower end a horizontal flange, K, between the lower surface of which and the upper surface of the plate L is arranged a disk of rubber, M, the latter being held in place by bolts N, passing through the said plate L and flange K. The disk or valve M is of suitable size and outline to enter and impinge the converging walls of the valve-seat M. The upper threaded end of the tube or cylinder J engages the internal thread of the screw Q, which is supplied with a hand-wheel P, and is inclosed between the collars Q on the transfer-pipe F. The pipe F is stationary and the tube J is adjustable vertically thereon by means of the screw Q. By operating the screw in one direction it will cause the elevation of the cylinder J, and consequently raise the valve M from its seat H, at which time the sand or other granular filtering material in the compartment C may return through the space between the said seat and the pipe F into the lower compartment, D, and when the said screw is rotated in the opposite direction the cylinder J will be lowered and the valve M will come in contact with its seat H, and thus close the opening between the two compartments of the filter. The cylinder J is feathered on the pipe F, as shown at R, in order that when the screw is turned the said cylinder will have a direct vertical movement without rotating.

It will be observed that the rubber valve M may be compressed more or less firmly against the converging walls on its seat H by the amount of rotation of the screw O, and in this respect the valve, constructed as described, is of great advantage, since a perfectly water-tight joint may be formed, even though particles of sand may have been deposited on the sides of the valve-seat. The valve described is superior, in that it will resist the abrasion of the sand passing from the upper to the lower compartment of the filter and will not become worn except through long-continued use. The rubber disk M, also, may be detached and a new disk substituted without difficulty and at a trifling expense.

The diaphragm B, to the center of which the valve-seat H is secured, is of cast-iron and is secured on tie-rods connecting the cast-iron head S of the filter with the cast-iron base T, as illustrated in Fig. 2, that portion of the filter between the diaphragm and the head and base being of boiler-iron.

In the base of the filter are the funnel-shaped formations V, arranged, as shown in Fig. 3, to cover a large portion of the interior face of the lower head of the filter. The funnel-shaped formations V, (illustrated in Figs. 1 and 3,) are cast in the lower head, T, and connect with the passage W leading to the delivery-pipe X, by which the filtered water may be led from the apparatus. The openings at the upper and lower ends of the funnels V are covered by perforated metal or wire cloth Y, and the space between these two pieces of wire-cloth or perforated metal is about four-fifths filled with coarse shot or other suitable spherical bodies, Z, the purpose of which is to permit the use of wire-cloth of coarse mesh or coarsely-perforated metal at the upper and lower edges of the funnels V, at the same time preventing the escape of the sand or other filtering media. Where wire screens alone are employed to support a bed of filtering material they must necessarily be of delicate texture, (otherwise the sand would escape with the water,) and hence they invariably, especially in large filters, become bent, broken, and clogged with impurities, and repairs are frequently required, resulting in delays and expense. When, however, the spherical bodies Z are made use of, coarse perforated metal or wire-cloth may be employed, the spherical bodies serving to prevent any sand which might pass through the upper piece of wire-cloth from escaping with the water. Upon the reversal of the current for the purpose of cleaning the filter-bed the spherical bodies will be loosened up and permit any sand and impurities held by them to repass upward through the wire-cloth into the filter, and thence upward through the transfer-pipe F.

The water to be filtered passes into the compartment D through the supply-pipe A', having a valve, B', and the purified water escapes into the delivery-pipe X, before mentioned, having a valve, C'. The supply and delivery pipes A' and X, respectively, are connected by a pipe, D', supplied with a valve, E', and from the pipe X, between the pipe D' and the filter, a pipe, F', having a valve, G', passes into the upper compartment of the filter. From the upper portion of the upper compartment, C, passes an escape-pipe, H', for waste-water, and from the upper portion of the compartment D passes, also, an escape-pipe, I', for waste-water, the latter pipe having a valve, J', and leading into the waste-pipe H', above mentioned.

In the operation of the filter above described, the bed of filtering material being in the lower compartment, and the valves J', G, E', and C' being closed, and the valves B' and C' being open, the water to be purified is passed into the compartment D through the pipe A', whence it percolates downward through the filtering material E, the impurities being arrested in transit, and escapes into the various funnel-shaped formations V; thence passing downward through the shot and into the space W, from which it is delivered through the pipe X into the service-pipes of the city or house. After the bed of filtering material has become foul from the arrested silt and other impurities it will be necessary to wash the same, and this is accomplished by closing the valves B' and C' and opening the valves E' and G, under which condition of the apparatus the water will flow through the pipes A' D² and into the space W in the base of the filter, thence upward through the shot Z and perforated material or wire-cloth Y into the lower portion of the filter-bed E, the effect being that the filtering material will be thoroughly agitated in all its parts, and, the pressure of water continuing, the sand, with the water, will flow upward through the transfer-pipe F and be deposited in the upper compartment, C, of the filter, the waste-water being permitted to escape through the pipe H'.

The operation of cleansing a bed of filtering material by transferring it through a connecting-pipe from one to another compartment of the filter is fully described and claimed in the Letters Patent issued to me, as aforesaid.

It is a matter of the utmost importance that the bed of granular material E be thoroughly agitated throughout all its parts (especially those parts contiguous to the sides of the lower portion of the filter) by the water flowing upward through the wire-cloth or perforated metal Y during the washing process, since if this is not done the sand will remain firm adjacent to the walls of the filter, gradually taper downward in the form of an inverted cone toward the lower end of the transfer-pipe F, and will in this condition, after the filter has been in use for a time, become hardened by the accumulation of impurities and form an obstruction to the successful use of the filter. In some instances I have built an inverted cone-shaped formation around the lower inner circumference of the filter, in order to direct the sand to the mouth of the transfer-pipe F; but I consider it necessary, especially when it is desired to filter large quantities of water, to utilize every available space within the filter, and to this end the said inverted cone-shaped formations have been discarded and the series of inlets V supplied, whereby I am enabled to secure all of the space within the compartment D for the filter-bed, and at the same time prevent any portion of the latter from becoming hardened or resisting the action of the water during the washing process. When a series of inlets, V, for admitting the water during the washing process is employed, all of the sand within the compartment D will enter the washer-pipe F and be transferred to the upper compartment, C, in the manner before described, no important portion of the same remaining in the lower compartment. After the sand has been transferred into the upper compartment, and it is desired to return the same to the lower compartment, the valves G and E' are closed, and the valve M elevated from its seat by means of the screw O, at which time the sand will return through the space at the center of the diaphragm B into the lower compartment, the water in which in the meantime being permitted to escape through the waste-pipe by opening the valve J'. After the sand has re-entered the lower compartment, D, the valves M and J' are closed, and the valves B' and G' opened, this condition of the valves permitting the first water filtered through the bed E, and which may be more or less impure, to ascend through the pipe F' and enter the upper compartment of the filter, where it may assist in washing the sand-bed upon its being again transferred to that compartment. After the compartment C has been again about filled with the first water passed through the filter, the valve G' will be closed and the valve C' opened, and the operation of filtering proceeded with, as before.

In Fig. 7 I have illustrated an arrangement of the funnel-shaped formations V in a filter of large size, the said arrangement being taken from filters of my own construction six and one-half feet in diameter. In the filters of this size it might be difficult or impracticable to cast the funnel-shaped formations V in the lower head of the filter, and I have therefore cast them separately and connected them by means of the branch pipes M' with pipes N', leading to the delivery-pipe X, as shown in said Fig. 7. It will be found expedient in filters of this size to distribute the parts V over the greater portion of the lower head of the filter, and to employ four or more transfer washer-pipes, F, as well as to connect the heads of the filter by a series of tie-rods, O', and to sustain the walls of the filter by braces P'. I have introduced Fig. 7 for the purpose of illustrating the general plan and arrangement of the parts V in a large filter; but in Figs. 8 and 9 I show in enlarged views the particular construction of a single one of said parts for the purpose of more clearly disclosing the invention sought to be protected. In Fig. 9 I have omitted the shot or other spherical bodies Z from the funnel-shaped device V, since these are shown with sufficient accuracy in Fig. 1.

The castings V (shown in Figs. 7, 8, and 9) have an angular passage, R', leading from the pipes M' to the lower surface of the perforated metal or wire-cloth Y, as illustrated by dotted lines in Fig. 8, and in full lines in Fig. 9. The passage R' is curved adjacent to the wire-cloth Y, and in this curved portion is placed the metallic ball S'. During the operation of filtering, the ball S' is driven by the pressure of the water against a pin, T', as indicated in dotted lines, at which time the escaping water will pass around and over the ball, the casing being at V' to permit of this operation. When the filter is at rest the normal position of the ball will be at the lower point of the passage R', and upon the reversal of the current for the purpose of washing the filter-bed in the manner hereinbefore described the water will force the ball S' into the upper end of the passage R' and against the lower surface of the wire-cloth or perforated metal Y, at which time the ball will act as a resistance to the water, restricting its flow into each opening V, whereby all of the pipes M' will be filled with the water under pressure and each funnel-shaped opening V will be required to perform its proper share of the work, the purpose being to insure the thorough agitation of the filtering material in all its parts.

The ball S' may be placed in the passage leading to the funnel-shaped openings V in Fig. 1; but for clearness of illustration I have omitted them from the said figure and only show the same in Figs. 8 and 9. When the ball S' is in the position illustrated in Fig. 9, the water will pass around it in the angles of the passage R', indicated more clearly in Fig. 8 by dotted lines. It will not be necessary to employ the ball-valves S' in every instance, since the pressure of water will often be sufficient to fill all of the pipe M' and funnel-shaped openings V and thoroughly agitate the filtering material.

The funnel-shaped openings V are of marked advantage, in that the enlarged upper portion thereof exposes a large surface of the sand to the action of the water during the operation of washing the filter-bed or from which to receive the water while filtering.

In the foregoing description I have described the bodies Z as being spherical in form; but it is to be understood that this term is to cover any small bodies, such as granular structures which will resist the escape of the filtering material without unduly obstructing the flow of the water.

What I claim as my invention, and desire to secure by Letters Patent, is—

1. A filter consisting of compartments having suitable inlets and outlets for water and connected by a transfer washer-pipe, one of the compartments containing a bed of filtering material and having at the base of the bed numerous inlets for the water used in transferring the filtering material through the washer-pipe into the adjacent compartment, substantially as and for the purpose set forth.

2. A filter consisting of compartments having suitable inlets and outlets for water and connected by a transfer washer-pipe, one of the compartments containing a bed of filtering material and having distributed over its base a series of funnel-shaped openings protected by perforated metal or wire-cloth, substantially as and for the purpose set forth.

3. A filter consisting of compartments having suitable inlets and outlets for water and connected by a transfer washer-pipe, one of the compartments containing a bed of filtering material and having at the base of the bed a series of openings protected above and below by perforated metal or wire-cloth, and inclosing a quantity of spherical or granular bodies, substantially as set forth.

4. A filter consisting of compartments C D, connected by a transfer washer-pipe, F, and having suitable inlets and outlets for water, the base of the compartment D having openings V, protected above and below by perforated metal or wire-cloth Y, and inclosing spherical bodies Z, and leading into a passage, W, connected with the delivery-pipe, substantially as set forth.

5. A filter consisting of compartments C D, separated by a diaphragm, B, and having suitable inlets and outlets for water, combined with a transfer washer-pipe, F, passing from one compartment to the other, a valve-seat at the center of said diaphragm, and a valve secured on the lower end of the cylinder J, inclosing the pipe F, and adapted to be operated by a screw, O, substantially as set forth.

6. A filter subdivided by a diaphragm into compartments connected by a transfer washer-pipe and having suitable inlets and outlets for water, combined with a valve-seat in the diaphragm encircling the washer-pipe, a corresponding elastic valve, the cylinder inclosing the upper portion of said pipe and carrying said valve, and a hand-wheel engaging a thread on said cylinder, and being collared on the upper end of the transfer-pipe, substantially as and for the purposes set forth.

7. A filter consisting of compartments C D, connected by a transfer washer-pipe F, the base of the lower compartment containing protected openings V, in combination with the pipes A', D', X, F', H', and I', with valves, substantially as and for the purpose set forth.

8. In combination with a filter containing a bed of filtering material, the base having a series of funnel-shaped openings protected by perforated metal, the passage W, connecting said openings, and a delivery-pipe leading from said passage, substantially as set forth.

9. A filter having suitable inlets and outlets for the water and containing a bed of filtering material, combined with a base having a series of funnel-shaped openings protected above and below by wire-cloth and inclosing a quantity of spherical bodies, and a passage connecting said openings with a delivery, substantially as set forth.

10. A filter having suitable inlets and outlets for the water and inclosing a bed of filtering material in granular form, in combination with a series of openings, V, at the base of the filter protected by perforated metal, and a ball-valve, S', substantially as and for the purposes set forth.

Signed at New York, in the county of New York and State of New York, this 20th day of December, A. D. 1884.

JOHN W. HYATT.

Witnesses:
 CHAS. C. GILL,
 GEORGE COOK.